United States Patent

Blok

[11] 3,921,951
[45] Nov. 25, 1975

[54] LATERAL ROLL SUSPENSION
[75] Inventor: Simon Blok, Hulsberg, Netherlands
[73] Assignee: Laura & Vereeniging N.V., Eygelshoven, Netherlands
[22] Filed: Apr. 29, 1974
[21] Appl. No.: 465,367

[30] Foreign Application Priority Data
Apr. 27, 1973 Netherlands.................... 7305947

[52] U.S. Cl. ................ 248/373; 248/424; 296/19
[51] Int. Cl.² .................. F16M 13/00; A61G 3/00
[58] Field of Search ........... 248/373, 371, 398, 421, 248/424, 430, 188.1, 188.3; 74/55, 99; 5/118, 82; 296/19

[56] References Cited
UNITED STATES PATENTS

| | | | |
|---|---|---|---|
| 2,256,004 | 9/1941 | Thomas .............................. | 248/424 |
| 3,036,805 | 5/1962 | Hickman............................. | 248/373 |
| 3,456,912 | 7/1969 | Ellemberger....................... | 248/424 |
| 3,632,076 | 1/1972 | Rogers................................ | 248/373 |
| 3,752,526 | 8/1973 | Burgt et al.......................... | 296/19 |

FOREIGN PATENTS OR APPLICATIONS

| | | | |
|---|---|---|---|
| 859,982 | 1/1961 | United Kingdom................. | 296/19 |

*Primary Examiner*—Marion Parsons, Jr.
*Attorney, Agent, or Firm*—Roylance, Abrams, Berdo & Kaul

[57] ABSTRACT

A rectangular supporting frame, which can be mounted in a vehicle, has pairs of rollers protruding from its ends near the corners. A rectangular load carrier frame has transverse plates with pairs of substantially elliptical guide track slots in which the rollers ride. The slots are cut so that they form parts of ellipses having their major axes tilted from the planes of the frames and intersect to form an oblique angle and so that lines perpendicular to those axes intersect above the frames in a vertical plane which contains the center of gravity when the frames are at rest. In another embodiment the rollers are mounted on the load carrier frame and the guide slot plates are mounted on the supporting frame. Torsion bars are provided to prevent torsional flexing of the carrier frame. In a third embodiment linkages are provided between the two frames so that relative motion between them is similar to that with the slots.

5 Claims, 4 Drawing Figures

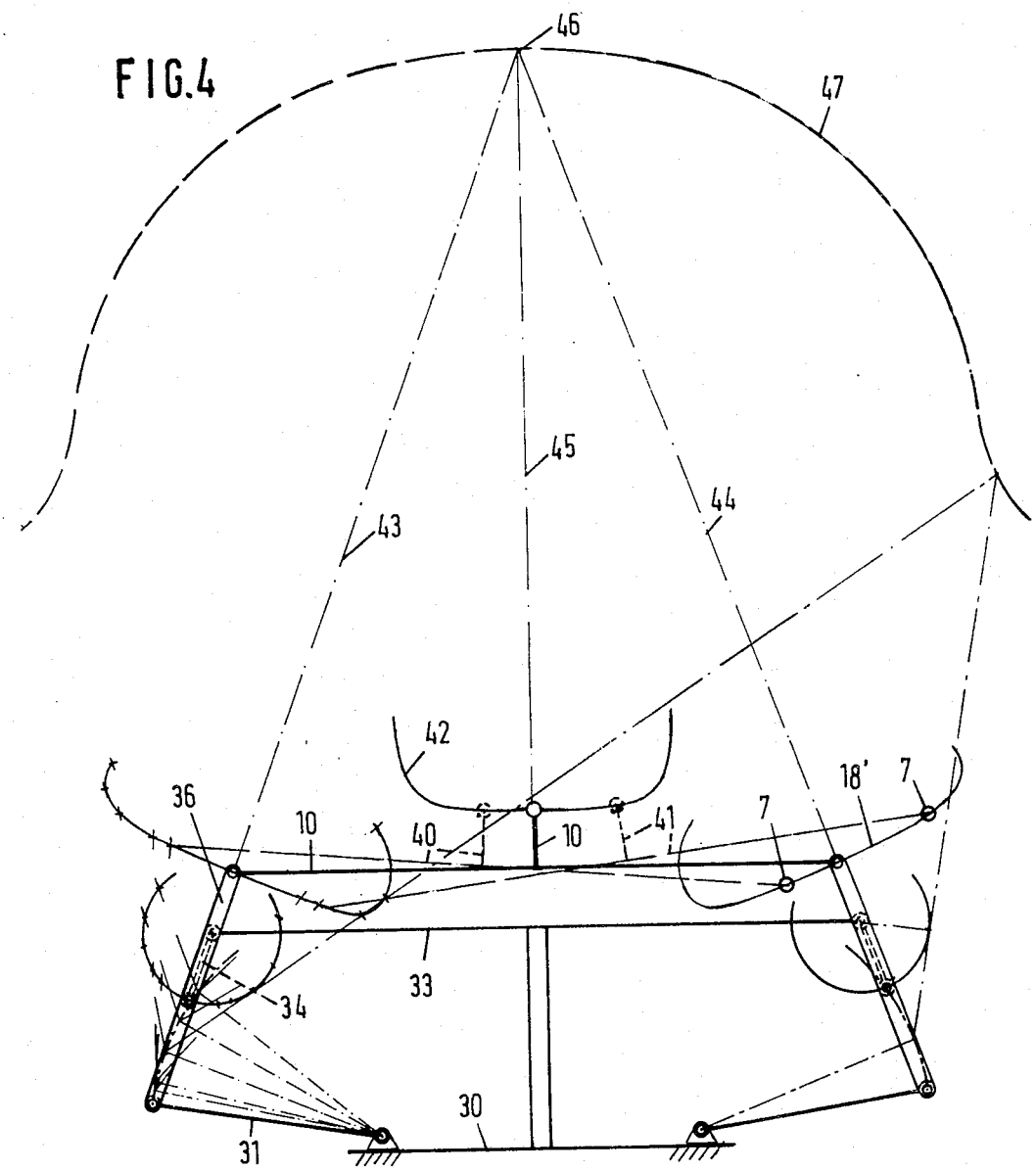

LATERAL ROLL SUSPENSION

This invention relates to apparatus for supporting a load carrier so that transverse acceleration and/or rotative displacements are smoothly taken up, and the resultant of the force of gravitation and a transverse force is directed approximately perpendicular to the plane of the load carrier.

Such a suspension allowing for roll and transverse movement is generally desirable for a load carrier which, in addition to the force of gravitation, is subject to a varying force directed transversely to the force of gravitation, and/or in which a rotary or rolling movement about a horizontal axis is to be expected, it being desirable, either from the nature of the load or from the way in which the load is secured to the load carrier, to minimize the effect of the varying transverse force and of the rolling movement. One example in which this arrangement is desirable is the suspension of a stretcher in an ambulance.

The subject arrangement is hereinafter referred to as a lateral roll suspension, by which is to be understood a suspension allowing for movement in a direction transverse to the force of gravitation and a rotary or rolling movement about a horizontal axis, independently of the momentary direction of movement of a vehicle or other apparatus incorporating the load carrier. The lateral roll suspension of a stretcher in an ambulance can play a role with regard to braking and acceleration forces, centrifugal forces in negotiating bends, and rolling movements of the vehicle as a consequence of superelevation of the road. Lateral roll suspension is also of importance, however, for cabins, such as lift cars moving at high velocity, certain ship's constructions, railway and other vehicles, etc.

It is noted that it is known to suspend a load carrier as a pendulum, in which arrangement the load carrier will assume the desired position under the influence of varying transverse forces. Such a construction, however, requires considerable space, especially if a smooth lateral roll suspension is required. For the support of patients on a stretcher, a natural frequency in the order of 0.5 Hz is desirable for all movements. With such a low natural frequency pendulum suspension would require a length of pendulum in the order of 75 cm, and intolerably great deflections may occur with high transverse accelerations which in practice may occur under certain conditions, for example, in cornering at high speed, or sudden braking. It is true that, in order to prevent excessive transverse deflections with low natural frequencies, it is possible to use suspension constructions with divided hangers or with transverse stops, but this does not result in smooth absorption of the lateral force, while additional structural provisions are necessary and roll compensation is insufficient.

It is an object of the present invention to provide an improved lateral roll suspension for a load carrier whereby with a low natural frequency in initial deflections from a zero position undue lateral displacements are prevented, while the construction requires little space.

According to the invention, there is provided apparatus for supporting a load carrier in a supporting frame, wherein said load carrier is supported on two support points spaced apart in the direction of the transverse force to be taken up, said support points being guided relatively to said supporting frame so that an approximately elliptical path of transverse movement is traversed, said paths of transverse movement being substantially symmetrical relative to a vertical plane containing the point of center of gravity of the load, the main axes of the elliptical paths perpendicular to said paths being divergent and intersecting one another over the point of gravity of the load.

As used herein, the term approximately elliptical path should be understood as being not only an elliptical path but any curved path in which, departing from a zero position, an upward part has an equal or greater curvature than a downward part, and in which each part of the path is of increasing curvature departing from the zero position.

It has been found that, with such paths of movement imposed upon the two support points of the load carrier, the point of gravity of the load itself will move in an approximately elliptical path with the main axis of the path of movement of the point of gravity being directed substantially vertically. The initial displacements of the point of gravity from the zero position will take place in a part of the path deviating only slightly from the horizontal direction, with which a natural frequency in the order of 0.5 Hz can easily be realized. In this connection the load carrier will perform such a rotary or rolling movement that the resultant of the force of gravitation and a transverse force is directed substantially at right angles to the plane of the load carrier. The reaction forces are supplied through the displacement of the point of gravity from the zero position upwards. With greater displacements there will be a gradually stronger vertical rise and rolling movement, so that the desired progressive lateral resiliency is obtained without there being a discontinuous characteristic of the reaction forces supplied by the system. When the point of gravity is subject to a varying lateral force, for example, as a result of centrifugal forces or braking or accelerating forces, the point of gravity will tend to move horizontally and will also be subject to a gradually increasing vertical displacement until the reaction forces are in equilibrium with the centrifugal force. The load carrier will thus perform a corresponding rotation.

In a first embodiment of the present invention, the elliptical path of the point of gravity is realized in that the spaced support points of the load carrier are embodied as rollers movable in approximately elliptical guide tracks in the support frame. It is also possible to use bearing rollers fixedly disposed in the support frame and to provide the load carrier with inversely elliptical guide tracks.

Furthermore the approximately elliptical displacements can be effected by realizing each support point by means of a four-membered linkage journalled in the support frame. Preferably, in this arrangement use is made of two aligned first link rods which in the inoperative position extend substantially horizontally and are directed outwardly, and two second link rods disposed above said horizontal first link rods and which when inoperative have a vertically depending position or slightly diverge downwardly, said second link rods being approximately half as long as said horizontal link rods, an outer pivot point of said horizontal link rods and a lower pivot point of said second link rods being in all instances connected by a third link rod, said third link rod continuing beyond the point where it is pivoted to said second link rod by an approximately equal length and being pivoted to the load carrier. The third link rod is approximately twice as long as the second link rod. It has been found that there is thus produced an extremely compact lateral-suspension construction, which can be accommodated under the load carrier.

In an elongated load carrier, such as a stretcher, such a four-membered linkage can be arranged at each of the four corners thereof. Also, a plurality of the support or pivot points longitudinally of the load carrier can be interconnected for coupled movement on opposite ends of the load carrier.

Some embodiments of the invention will now be described, by way of example, with reference to the accompanying diagrammatic drawings, in which FIG. 1 is a perspective bottom view showing several parts for supporting a stretcher in an ambulance;

FIG. 4 shows a number of positions occupied by several points and parts during a combined rolling and transverse movement.

Figure 1:
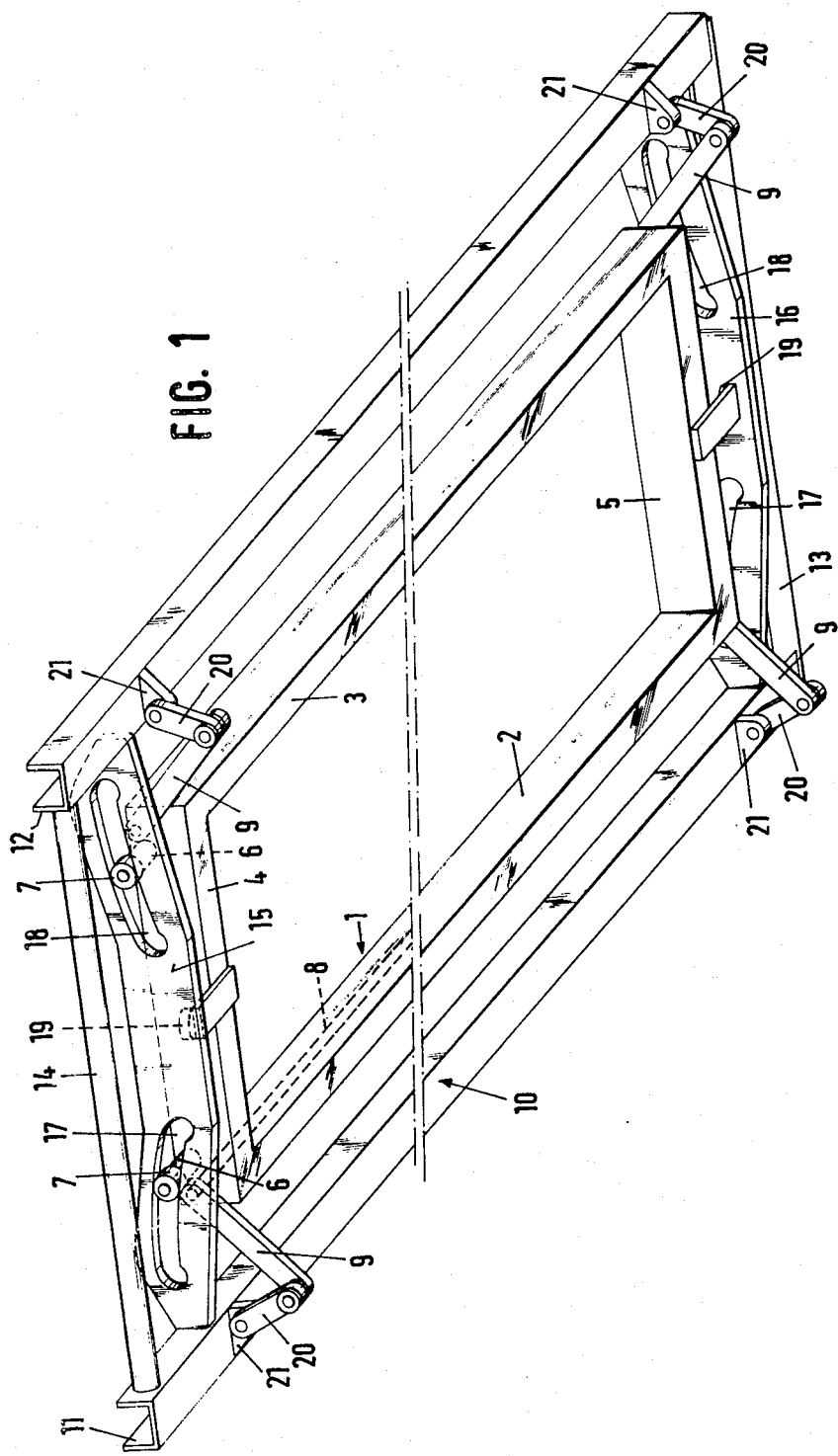

Referring to FIG. 1, there is shown a perspective bottom view of a structure for supporting a stretcher, to be mounted in an ambulance. The structure is resiliently mounted in the vehicle so as to be adjustable in height, in a manner known per se, so that is is very smoothly sprung for vertical and pitch movements, with a natural frequency in the order of 0.5 Hz. Furthermore the stretcher carrier will be adapted, in a manner known per se and not shown, for occupying the so-called Trendelenburg position. The structure is at the top provided with a carrying frame 1, comprising two longitudinal beams 2 and 3 connected by two end beams 4 and 5. Trunnions 6 are mounted at each end of each end beam, only two of such trunnions 6 being shown. Each trunnion carries a roller 7. Each longitudinal beam 2, 3 accommodates a torsion bar 8 having a torsion arm 9 at each end.

A stretcher guide or load carrier is generally indicated at 10. Stretcher guide 10 comprises a pair of U-sectioned longitudinal beams 11 and 12 interconnected at one end by an angle bar 13 and at the other end by pipe 14. A stretcher can ride into the ambulance on the troughs formed by beams 11 and 12, for example, by means of rollers mounted under the stretcher. Beams 11 and 12 are further interconnected by two cross-plates 15 and 16. Each cross-plate is provided with two guide tracks 17 and 18 of substantially concave shape viewed from below, which shape is designated herein as inversely elliptical and will be described in more detail hereinafter. These guide tracks can ride on trunnions 7 in the transverse direction of the load carrier. In the longitudinal direction the stretcher guide is held in position by rollers 19 between the end beams of frame 1 and cross-plates 15, 16. Each torsion arm 9 is connected through a pivoting arm 20 to a support 21 under a longitudinal beam.

Figure 2:
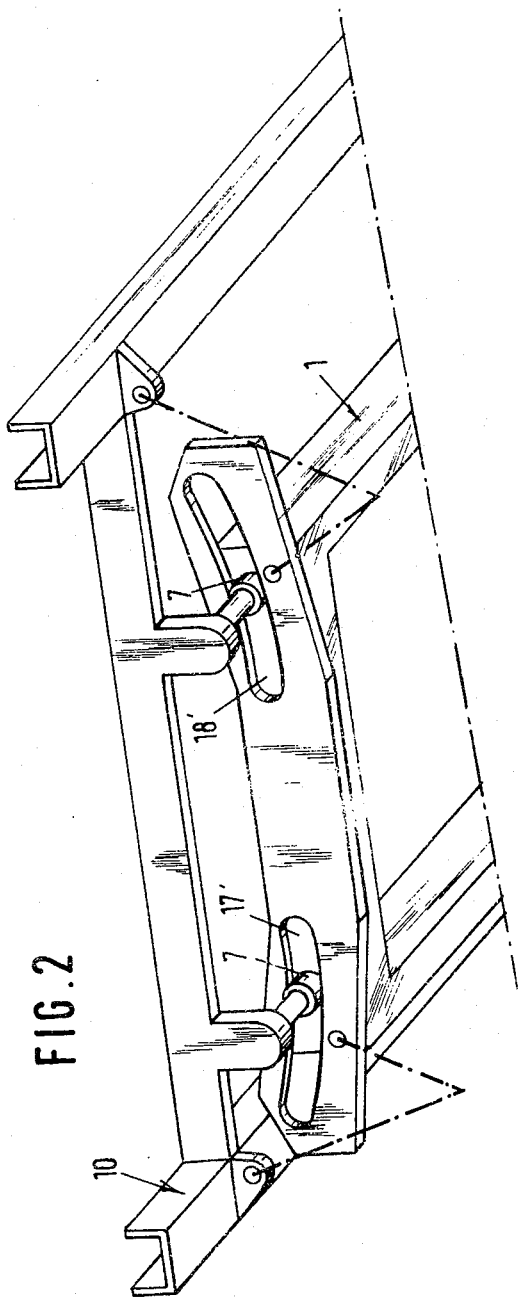
FIG. 2 shows, on a larger scale, an end view of a stretcher carrier provided with bearing rollers and approximately elliptical guide tracks for said rollers in a support frame.

FIG. 2 shows a modification of the embodiment of FIG. 1. In it support rollers 7 are fixedly secured to stretcher guide 10, and elliptical guide tracks 17' and 18' are provided in the carrying frame 1 of the structure. Guide tracks 17 and 18 of FIG. 1 can be regarded as inversely elliptical relative to elliptical guide tracks 17', 18' of FIG. 2.

Figure 3:
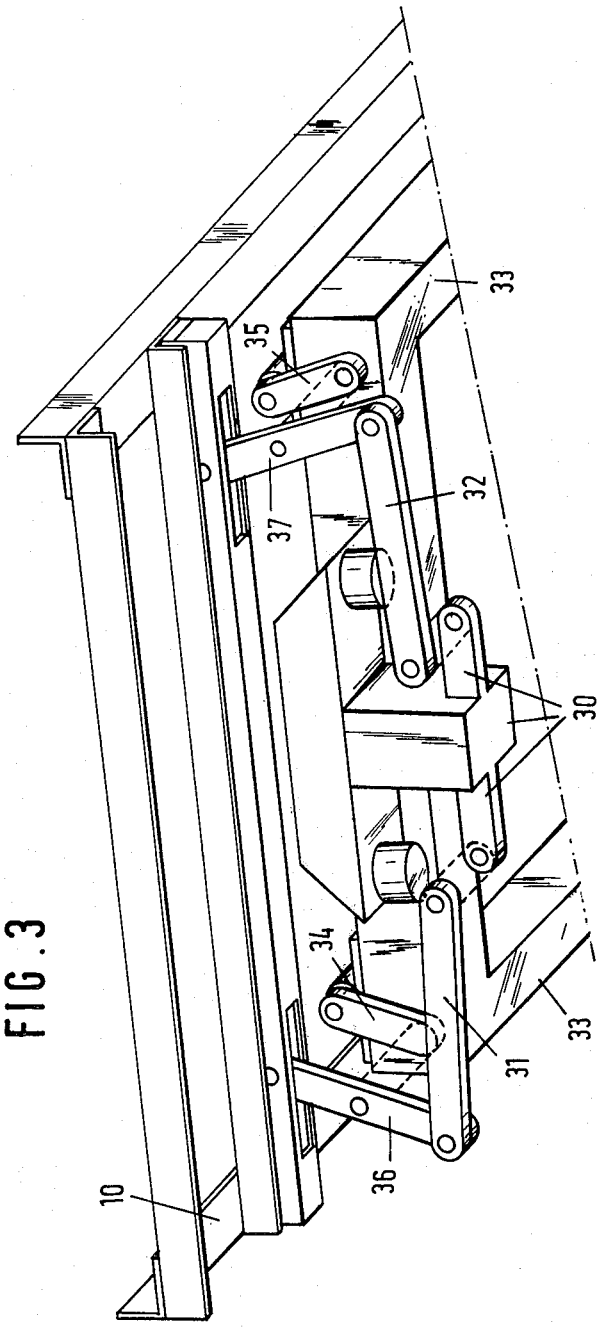
FIG. 3 is an end view of a stretcher supporting construction incorporating a four-membered linkage.

FIG. 3 shows a third embodiment for affording rolling and transverse movements of the stretcher guide. In it, the frame is provided with link rods 31 and 32, extending virtually horizontally in the inoperative position. Disposed above member 30 of the frame, to which rods 31 and 32 are journalled, is an upper frame 33 to which are secured at each end two link rods 34, 35 slightly diverging downwardly. Rods 31 and 34 are interconnected by a third link rod 36, while rods 32 and 35 are interconnected by a link rod 37. Link rods 36 and 37 are virtually as long as horizontal rods 31, 32, while the two virtually vertical rods 34 and 35 are about half as long and act on rods 36, 37 substantially in the middle thereof. The upper ends of rods 36 and 37 are pivoted to stretcher guide 10. Accordingly the upper ends of rods 36 and 37 correspond with rollers 7 in FIGS. 1 and 2. Owing to the linkage systems shown, there is obtained an elliptical displacement of the support points of the stretcher guide and of the point of gravity of the load on the stretcher similar to that in the embodiment of FIGS. 1 and 2. The linkage system is of the four-membered kind, the fourth member being the portion of frame 30, 33 which connects the two fixed pivots of the respective horizontal rods 31 and 32 and the and the respective vertical rods 34 and 35.

For clarity, the various link rods are shown not directly connected by pivot pins but connected by pivot shafts, namely, between 30 and 31 and 32, respectively and between 34 and 36 and 35 and 37, respectively. Naturally, the inner pivot points of arms 31 and 32 to frame member 30 can coincide.

The facility for transverse and rolling movements can be rendered inoperative in a known manner (not shown) by means of a braking or locking pawl when desirable for the treatment of a patient or for moving the stretcher into or out of the vehicle. For transverse and rolling movements in two mutually perpendicular directions, two of the arrangements described can be combined, one being turned through 90° relative to the other. If the load carrier is likely to be subjected to transverse forces in opposite directions of different magnitudes, for example, braking and accelerating forces, the elliptical paths of displacement need not necessarily be entirely symmetrical.

FIG. 4 illustrates in more detail the movement of the various parts in the embodiments of FIGS. 1 to 3. In the left-hand part of FIG. 4 there are shown various positions of rods 31, 34 and 36 as occur during transverse displacement and roll to left and right. On the right-hand side are shown a roller 7 and roller track 18' as per FIG. 2, with which a corresponding displacement is realized. The transverse displacement and the roll of the stretcher guide are shown with broken lines at 40 and 41, respectively. Shown at 42 is the path of displacement of the point of gravity of a load on the stretcher. 43 and 44 designate the perpendiculars from the path of movement of rod 36 and from a roller track 18', respectively. These two perpendiculars intersect in the middle position in point 46 located in the axis of symmetry 45 over the point of gravity 42. This point of intersection is during displacements from the middle position of the load carrier always the momentary centre of rotation thereof. As appears from the configuration of the path of movement of the upper end of rod 36 or of roller track 18', the paths of movement are approximately elliptical, the short main axis of the ellipse coinciding with the perpendiculars 43 and 44 drawn. From the middle position the path of movement is gradually more strongly curved upwards. The displacement of the load on the load carrier also occurs approximately along an ellipse (42) having a gradually increasing curvature. By 47 is designated the locus of the points of intersection of the perpendiculars to the momentary path of movement of support points 7 or of the corresponding ends of the link rods concerned. This point of intersection is always the momentary centre of rotation of the stretcher guide.

I claim:

1. An apparatus for supporting a load to be subjected to translational forces comprising the combination of
   a supporting frame;
   a load carrier;
   first and second support members both attached to one end of said load carrier and said supporting frame, said members being spaced apart in the direction of the forces;
   first and second means mounted on the other one of said load carrier and said supporting frame for supporting said load carrier and for guiding said first and second support members, respectively, along separate and different substantially elliptical path of transverse movement in response to application of the forces,
   said paths of transverse movement being substantially symmetrical with respect to a vertical plane containing the center of gravity of the load and load carrier when the load carrier is at rest, the major axes of the ellipses containing said paths forming an oblique angle such that the axes perpendicular to said major axes intersect said plane above said center of gravity; and
   third and fourth support members and third and fourth means for supporting and guiding at the other end of said carrier.

2. An apparatus according to claim 1 wherein
   said support members comprise first and second rollers mounted for rotation on said load carrier; and
   said first and second means mounted on the other one of said load carrier and said frame comprise first and second substantially elliptical guide tracks, and
   means for supporting said guide tracks on said supporting frame.

3. An apparatus according to claim 1 wherein
   said support members comprise first and second rollers fixedly mounted for rotation on said supporting frame; and
   said first and second means comprise first and second substantially elliptical guide tracks, and
   means for mounting said guide tracks on said load carrier.

4. An apparatus according to claim 1 wherein
   said first and second support members comprise first and second pivot axles and means for mounting said pivot axles on said load carrier;
   and wherein each of said first and second means for supporting said load carrier and for guiding said support members comprises a linkage having
   a first link pivotally connected at one end to a point on said supporting frame, said first link being substantially horizontal when the forces are not applied;
   a second link pivotally connected at one end to said supporting frame at a higher point than the point of pivotal connection of said first link; and
   a third link pivotally connected at one end to said load carrier, at the other end to the other end of said first link, and at a midpoint of said third link to the other end of said second link,
   said first and third links being of approximately equal length and said second link being approximately half the length of either;
   and wherein said first links extend away from each other from their points of connection to said frame and wherein said second links diverge downwardly from their points of connection to said carrier when the forces are not applied.

5. An apparatus according to claim 1 wherein said load carrier comprises an elongated frame having said first and second support members attached thereto at one end thereof;
   said carrier further comprising
   a torsion stabilizer interconnecting said support members on at least one side of said carrier.

* * * * *